United States Patent [19]
Parker et al.

[11] 4,069,482
[45] Jan. 17, 1978

[54] TARGET RANGE SENSOR

[75] Inventors: Clarence B. Parker, Pomona; Peter M. McCray, Claremont; L. Lamoyne Taylor, Alta Loma, all of Calif.

[73] Assignee: General Dynamics Corporation, Pomona, Calif.

[21] Appl. No.: 705,501

[22] Filed: July 15, 1976

[51] Int. Cl.² ........................ G01S 9/42; G01S 9/06
[52] U.S. Cl. .............................. 343/7.7; 343/12 MD
[58] Field of Search ............... 343/13 R, 12 MD, 7.7, 343/17.1 R, 5 DP, 112 CA; 235/151.32, 151.26

[56] References Cited

U.S. PATENT DOCUMENTS

| | | | |
|---|---|---|---|
| 3,142,822 | 7/1964 | Martin | 343/17.1 R |
| 3,745,571 | 7/1973 | Chwastyk et al. | 343/7.7 |
| 3,789,244 | 1/1974 | Provanzano | 307/251 |
| 4,001,826 | 1/1977 | Moulton | 343/7.7 |

*Primary Examiner*—Maynard R. Wilbur
*Assistant Examiner*—Lawrence Goodwin
*Attorney, Agent, or Firm*—Henry M. Bissell; Edward B. Johnson

[57] ABSTRACT

The specification discloses a radar sensor for detecting short-range, slowly moving objects and using the range versus time data to develop a prediction of the time at which the range of the object will be at a minimum to the sensor. The sensor uses a pulse transmission of a radio frequency signal with object reflections being received and detected. Subsequent signal processing eliminates returns from clutter and stationary objects so that signals from low velocity objects can be detected. Computations are performed in a digital processor to compute an estimate of the time and of the range when the object will be closest to the sensor.

14 Claims, 9 Drawing Figures

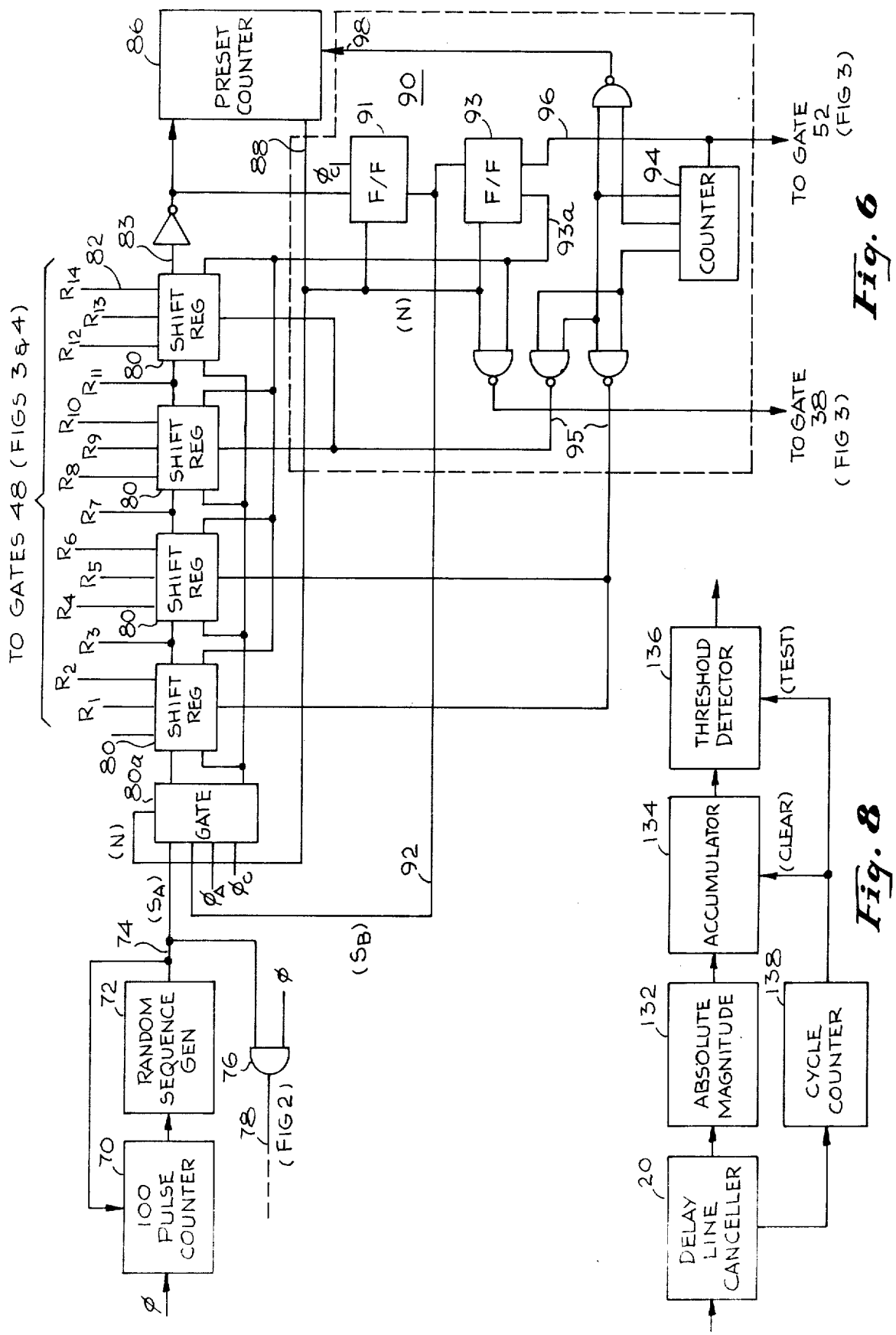

TARGET RANGE SENSOR

BACKGROUND OF THE INVENTION

1. Field of the Invention

This invention relates to radar systems wherein the output is used to digitally compute the predicted path of travel of the detected object.

2. Description of the Prior Art

Radar devices are known to be used to detect moving objects relative to the radar station. Presently known devices for detecting short range objects use continuous analog wave transmissions. The detector output at any instant represents the summation of returns from all ranges. Improvements in target signal-to-clutter ratios by range gating in such arrangements is not possible.

Typical moving target station radars employ the superheterodyne receiver principle, with separation of target Doppler signals from stationary returns being accomplished by elaborate crystal filter arrangements. The very low Doppler frequencies obtained from relatively slow-moving objects, however, are detected only with difficulty by such crystal filters.

SUMMARY OF THE INVENTION

The present invention contemplates a technique using a homodyne transceiver. A single radio frequency source provides the transmitted signal and the reference for a coherent detector, so that tracking between return signal frequency and local oscillator is automatic. The present invention contemplates a relaxed requirement for long term stability of the radio frequency oscillator. In accordance with one aspect of the invention, target returns over a period of time are integrated before developing an output signal. Thus, it is believed that a significant signal gain is effectively achieved while reducing the effects of receiver noise to the point where receiver noise is not critical.

In accordance with another aspect of the invention, the range gate switching arrangement contemplates the use of a single electronic switch per range bin for range gating signals in sequential order to a bank of integrators, sequential gating of the integrated outputs to an analog signal to digital component converter and parallel discharging of the integrator circuits for simultaneous reset. In accordance with yet another aspect of the invention, an electronic switch arrangement employs the use of a field effect transitor which is actuated by simple transistor gating or switching means that do not include the use of complicated AND and OR digital processing circuitry.

In yet another aspect of the described invention, scaled resistor-capacitor integrator values are used so that the gain of the integration process for a given range bin is inversely proportional to $R^2$ (the range squared). In such a manner, sensitivity time control function is greatly simplified in circuit elements.

BRIEF DESCRIPTION OF THE DRAWINGS

A better understanding of the present invention may be gained by referring to the following detailed description taken in conjunction with the accompanying drawings, in which:

FIG. 6 is a block schematic diagram of one portion of the invention as seen in FIG. 1;

FIG. 8 is a block diagram representation of a delay line canceller useable within the preferred embodiment of the invention.

DESCRIPTION OF THE PREFERRED EMBODIMENT

Figure 1:
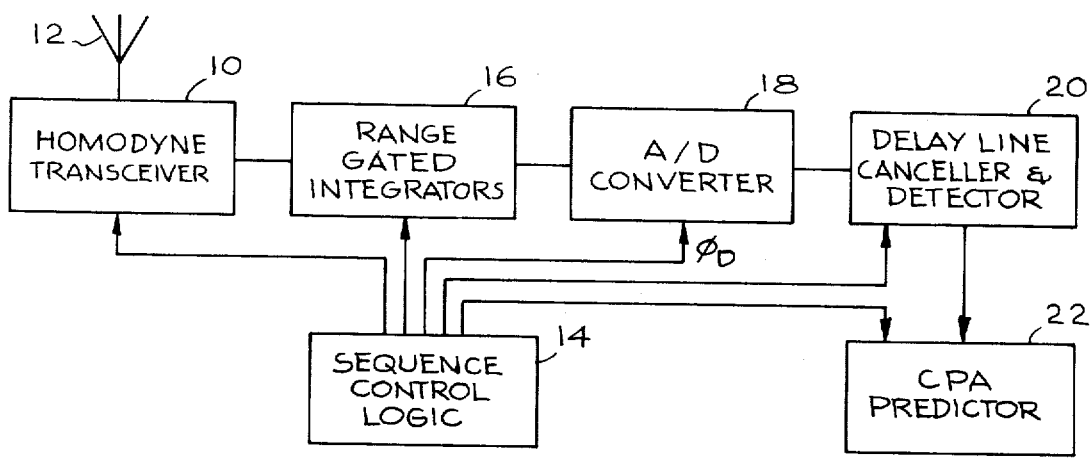
FIG. 1 is a block schematic diagram of one embodiment of the invention.

In an effort to greatly simplify the component hardware and the electrical computation necessary to provide a "closest point of approach" prediction with regard to relatively slow-moving objects capable of detection by radar type instruments, the target range sensor as seen in schematic block diagram of FIG. 1 is provided. Essentially, the target range sensor comprises a homodyne receiver 10 having a antenna 12 for the transmission and receipt of radio frequency signals. A short control pulse from the sequence control logic 14 controls logic gates within the homodyne transceiver 10 to deliver a gated radio frequency signal from a CW oscillator, to be described in detail below, to the antenna 12 where it is radiated to illuminate the target range. Reflected signals or echoes from objects such as targets are received by the same antenna 12. The echoes are amplified and delivered to a coherent mixer for detection. The output of the homodyne transceiver 10 will be pulses which are proportional to the amplitude of the echo or received signal and the cosine of the phase angle between the echo signal and the oscillator reference. This output is then sequentially time gated into range "bins" and is integrated in a bank of range gated integrators 16. The integrated signal is delivered by an output to an analog-to-digital converter 18. The outputs from analog-to-digital converter 18 will be time gated samples of a video signal. The delay-line canceller and detector 20 operates on the digitized output from the analog-to-digital converter 18 in the fashion of a band-pass filter so as to remove the "direct current" and "very low frequency" components while passing higher frequencies. By forming the summation of the absolute magnitude of a number of the delay-line canceller outputs, the signal is effectively "full wave detected". If the detected signal exceeds a prescribed threshold level, an object or target detection is sensed, and the digital signals are processed by a digital processing unit 22 labelled on the accompanying drawings "CPA predicator" to indicate a "closest point of approach prediction" which will be the output of the processor 22. The processor 22 computes the range versus time by summation of vectors of orthogonal components of the signals passed by the detector 20. By digital computation, the time and range of an estimated point of closest approach of the detected object or target can be computed and displayed.

Figure 2:
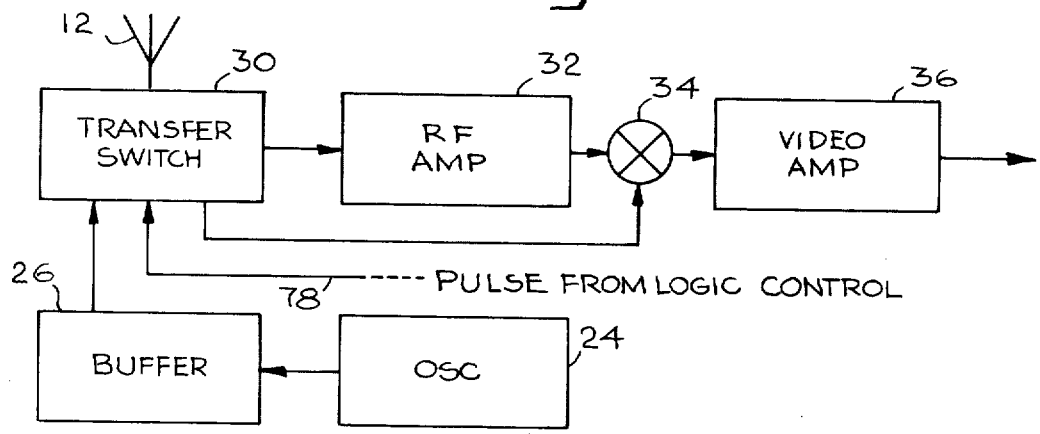
FIG. 2 is a block schematic diagram of one portion of the invention as seen in FIG. 1.

Turning now to a more detailed description of the homodyne transceiver 10, the diagram of FIG. 2 is provided. FIG. 2 is a block schematic diagram of the components of the homodyne transceiver 10. Signals are generated in a CW oscillator 24. The oscillator may be a Colpitts circuit which is lightly loaded and coupled to a common-emitter buffer amplifier stage 26. Microstrip construction is preferably used with shorted transmission line sections forming the inductive elements. Other satisfactory construction may be used, it may be appreciated. The buffer stage 26 delivers the required output stage power while providing a high degree of isolation between the variable voltage-standing-wave-ratio (VSWR) of the load and the tuned circuits of the oscillator 24. Preferably, the oscillator 24 and the buffer 26 are packaged in separate enclosures to increase isolation of the load effects.

A transfer switch 30 is provided to gate a short radio frequency pulse to the antenna 12 while disconnecting the mixer 34 and the radio frequency amplifier 32.

A radio frequency amplifier 32 is provided having sufficient gain to boost the expected maximum signal to about 0 dbm. The radio frequency amplifier used in this embodiment comprises a cascaded series of broad-band common emitter stages. A broadband response is used to eliminate tuning requirements and to provide the possibility of frequency agility in the transmitted signal. The particular radio frequency amplifier used may be one of any of a variety of forms, many of which are commercially available in the marketplace. One such commercially available unit used with satisfactory results was a Watkins-Johnson model 6200-354, available from the Watkins-Johnson Company, Palo Alto, California.

The balance mixer 34 used in the present preferred embodiment is a conventional diode bridge configuration having transformers to couple the signal from the radio frequency amplifier 32 and the oscillator reference. Coherent detection of the signal is performed whereby the output is proportional to the amplitude of the input signal and to the cosine of the phase angle between the signal and the reference frequency inputs. The local oscillator reference frequency is derived from the oscillator 24, and is identical to the transmitted signal frequency. The mixer 34 converts its inputs directly to video frequencies in the fashion of a homodyne detector. The conventional diode bridge configuration used in this preferred embodiment is available on the commercial marketplace. A suitable bridge network used satisfactorily has been part number M5D available from Relcom Division, Watkins-Johnson Company of Palo Alto, California.

The output from the balance mixer 34 is delivered to a video frequency amplifier 36 in order to provide additional gain and sufficient dynamic range to drive the range gated integrators 40. A discrete component output circuit is provided separately from the gain circuit, in order to increase the output drive capability. Again, a commercially available video amplifier has been used and found satisfactory, and may be obtained from Fairchild Semiconductor Company, Sunnyvale, California as part uA733.

The reflected signals or echoes from the objects or targets are received by the same antenna 12, are amplified in the radio frequency amplifier 32 and delivered to the coherent mixer 34 for detection. The reference oscillator for this detection is the same oscillator 24 used to supply the transmit signal, so that received signals are converted directly to bipolar video signals in the fashion of a homodyne detector. The balanced mixer 34 output will be pulses which are proportional to the received signal amplitude and the cosine of the phase angle between the signal or echo and the local oscillator 24 reference signal. The output of the video amplifier 36 appears at switch 38 in the range gated integrator 16, seen in more detail in FIG. 3 of the drawings. Each range gated integrator 16 is comprised of a resistor 44 in series with a capacitor 46 and a range gate switch 48. There are fourteen such circuits. In this embodiment the gate switch 48 comprises a field effect transistor circuit arrangement whose actuation and circuit details are seen more clearly in FIG. 4 of the accompanying drawings.

Figure 3:
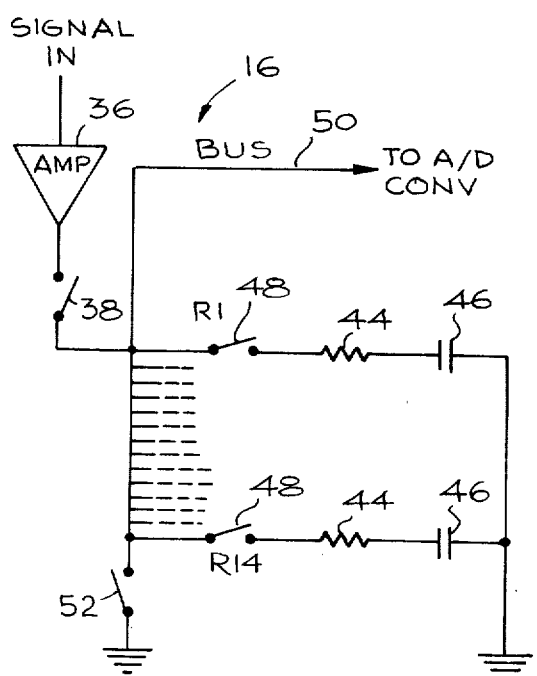
FIG. 3 is a detailed electrical schematic diagram of the preferred switching embodiment of the invention as seen in FIG. 1.
Figure 4:
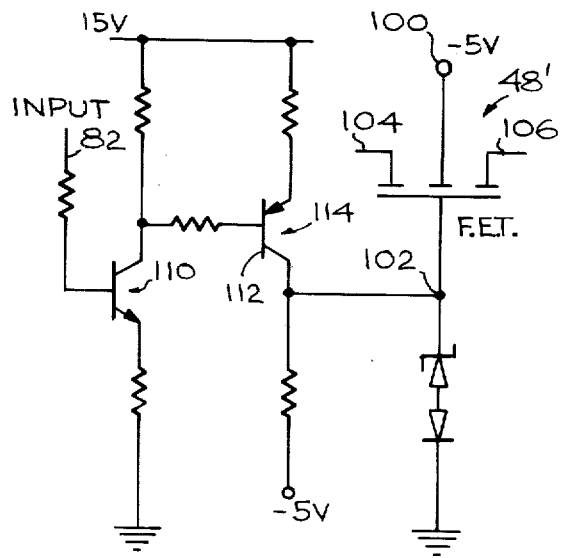
FIG. 4 is a block, electrical schematic diagram of the control logic of the preferred embodiment of the invention as seen in FIG. 1.

Operation of the gate switch 48 is as follows. Each switch control signal is applied to the respective input 82 of a control circuit for the field effect transistor (FET) switch 48', shown in detail in FIG. 4 of the accompanying drawings. Field effect transistor 48' is a metal oxide semiconductor which normally is in a nonconducting state. Field effect transistor 48' is placed in the conducting state when the voltage from node 100 to node 102 is such as to induce conductance from the nodes 104 to 106. A switch control signal is received at input 82 to switch transistor 110 into the conducting state, thereby creating the correct control voltage at control node 112 of transistor 114. Common collector transistor circuit 114 then is switched into the conducting state, lowering the voltage at node 102 to such a level that field effect transistor 48' is placed in the conducting state. Voltage signals are allowed in line 104 to pass to line 106. As soon as the pulse control signal is removed from the input 82 of the transistor switch circuit, transistor 110 reverts to a nonconducting state, switching transistor 114 to a nonconducting state and raising the voltage at FET node 102. The field effect transistor 48' is switched then to a nonconducting state, opening the circuit between FET nodes 104 and 106 in the switch 48'. Referring to FIG. 3, in such manner similar switches are utilized between the amplifier 36 and the in/out bus 50; the in/out bus 50 and ground; and the in/out bus 50 and each of fourteen resistors as illustrated by switch 48 and resistor 44.

Each resistor-capacitor network has in series a gate 48. The fourteen gates 48 are operated sequentially by virtue of a sequence control on the field effect transistor from the sequence control logic 14, which will be explained in greater detail below. While the system is in the integrate mode a control signal from the sequence control logic 14 activates gate 38 to give it a conducting state and allow signals to enter the integrators. Thus, signals in pulse form arriving from the amplifier 36 during the conducting state of gate 38 will be directed into one of the resistor-capacitor circuits, depending on which of the gates 48 is closed at the moment that the pulse is so received. Each field effect transistor switch 48 is activated in a conducting state for a period of time corresponding to each range bin time. Signal charges accumulate on the respective capacitor 46 receiving the individual signal, thus developing a voltage proportional to the integral of the signal within that range "bin". After a prescribed number of transmit-receive cycles, the integration process is stopped, and the voltage on each integrator capacitor 46 is in turn connected back onto the in/out bus 50 which leads to the input of the analog-to-digital converter 18.

The sequential operation of the field effect transistor switches 48 is controlled, again by the sequence control logic 14, which will be explained in greater detail below. The readout process is programmed at a slower rate so as to be compatible with the time requirements for the converter 18. When the readout process is complete, all field effect transistor switches 48 are closed simultaneously with a closing of a grounding switch 52 so that all accumulated signals on the capacitors 46 are discharged. Simultaneously with the closure of the gates 48 and the gate 52, the gate 38 is closed so that the direct current restorer function for the video amplifier 36 is accomplished.

It may be appreciated that the use of scaled resistor-capacitor circuit integrator values provides a gain of the integration process for a given range bin inversely proportional to the range distance, squared. By such a simple configuration, sensitivity time control, often performed by complicated gain control circuitry in the receiver system, is eliminated. Additionally, the same set of range gate switches 48 is used to sequentially switch signals to the integrators, sequentially switch the integrated signals to the analog-to-digital converter 18, and to simultaneously discharge all integrators to a zero or reference voltage state.

The analog-to-digital converter 18 converts each integrated signal output from the range gated integrator 16 into a 12 bit digital equivalent. Larger or smaller bit words may be used as desired, it may be appreciated. The digital output of the analog-to-digital converter 18 may be used in either a bit serial form as the conversion takes place, or in a 12 bit parallel form after the conversion is completed. Either output can be used successfully in the practice of this invention. The analog-to-digital converter 18 may be taken from any of several types which are currently available in the marketplace. A Burr Brown model ADC 85C-12 converter has been successfully used in the practice of this invention.

Figure 5:
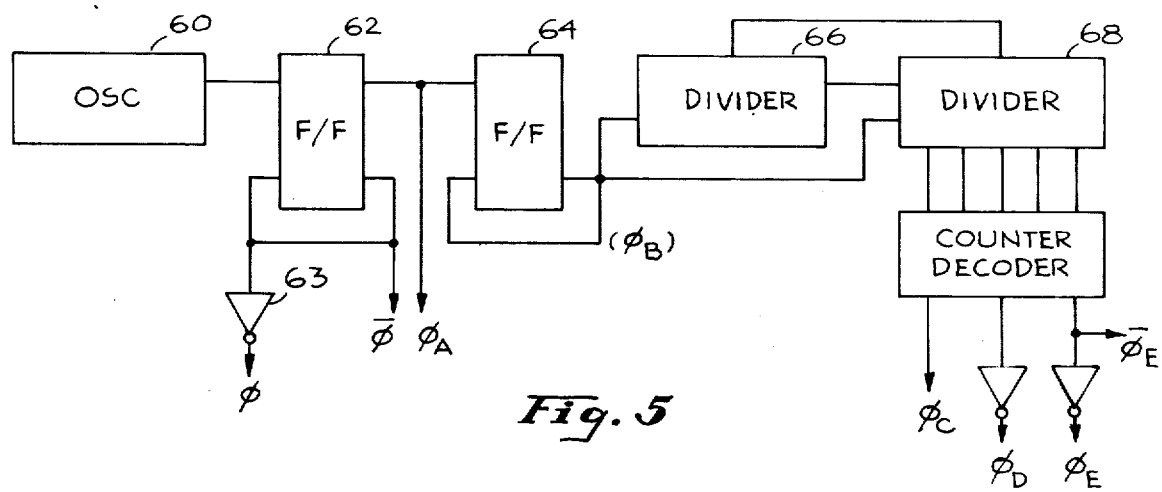
FIG. 5 is a block schematic diagram of a timed pulse generation.

Clock pulses at various frequencies as required for operation of the sequence control logic are developed by the clock generator, FIG. 5. As shown in the accompanying schematic of FIG. 5, a 40 MHz oscillator 60 may be used to generate pulses at its output coupled to a divider 62 which has at its output $\bar{Q}$ 20 MHz pulses designated $\bar{\phi}$, or $\phi$ after inverter 63. Divider 62 is a flip-flop circuit having output $\phi_A$ at its Q output. Additional divider 64, divider 66, and divider 68 are used to produce clock pulses of various time intervals as required in the control logic. Divider 64 is also a flip-flop with flip-flop 62 Q output as its CK input. The $\bar{Q}$ output of flip-flop 64, designated $\phi_B$, is an input to the divider 66 and to the divider 68.

Clock pulses at the 20 MHz rate are counted in a two-section synchronous counter to develop the pulse rate time interval. The first section 70, FIG. 6, counts for 100 pulses to provide a fixed interval of 5 microseconds. To this period is added a variable time interval, controlled by the second section which counts to a value in the range of from 0 to 63 as predetermined by a preset input from a pseudo-random sequence generator 72. The resultant output in line 74 is a pulse rate time trigger pulse divided down from the 20 MHz clock by a value between 100 and 164 to give an average pulse rate time of 6.6 microseconds with a pseudo-random distribution over the range of 5 to 8.2 microseconds. Each pulse rate time pulse advances the pseudo-random sequence generator so that the pulse rate time changes on a pulse to pulse basis. The pseudo-random sequence generator used in the preferred embodiment consists of a 24 stage shift register with its input developed from an exclusive-NOR combination of the outputs of bits 19 and 24. This gives a maximum sequence length of 16,766,977. Thus the average clock period of 6.6 microseconds provides for a cycle repetition in approximately 110 seconds. This cycle is substantially long compared to the expected engagement cycle.

Figure 6A:
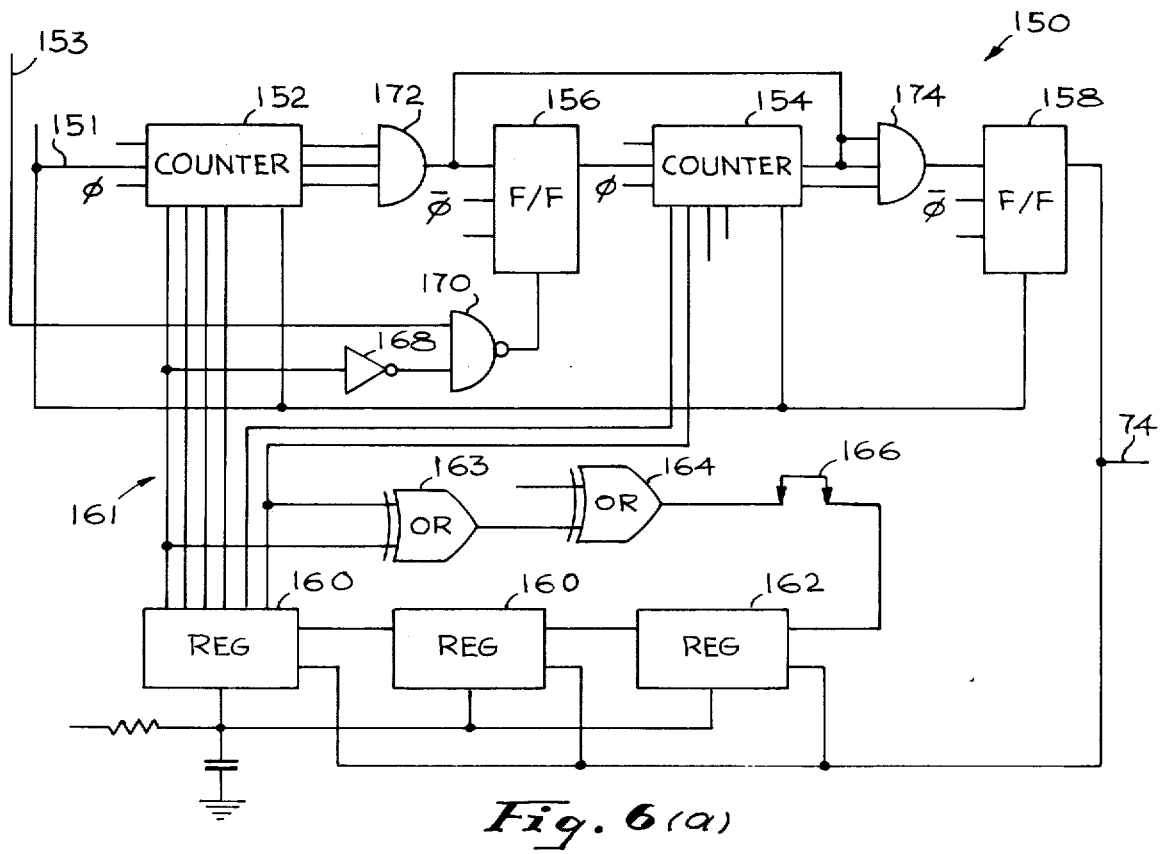
FIG. 6a is a block circuit schematic of one portion of the diagram of FIG. 6.

A circuit 150 which has been found satisfactory as a random sequence generator is given in FIG. 6a. The 100 pulse counter 70 has a J-K flip-flop at its output. The P input 151 to counter 152 is the Q output of the pulse counter 70 output flip-flop. The counters 152, 154 in this circuit are Model No. SN74163 available from Texas Instruments Co. Circuit output 74 resets pulse counter 70 by a feedback to K input of the pulse counter output flip-flop. The clock pulse $\phi$ synchronizes the counters 152, 154, and $\bar{\phi}$ synchronizes the J-K flip-flops 156, 158. The pulse counter output $\bar{Q}$ comprises a load input 153 to counters 152, 154 and a clear or reset input to flip-flop 158. The bit outputs 161 of registers 160, 162 are inputs to counters 152 and 154, having the most and least significant bits as inputs to exclusive OR circuit 163. The exclusive OR circuit 164 has as its other input a positive voltage. The registers 160, 162 are Model No. SN74164 available from Texas Instruments Co. A switch 166 is in series with the input to register 162. The registers 160, 162 and exclusive OR gates 163, 164 give random outputs 161 according to a predetermined program.

The least significant bit through inverter 168 and the pulse counter output 153 comprise inputs to NAND circuit 170, whose output is connected to the clear or reset input to flip-flop 156. AND circuits 172, 174 accumulate outputs of corresponding counters 152, 154 to corresponding J-K flip-flops 156, 158 resulting in output 74. The unused register inputs and the T inputs to the counters 152, 154 and the K inputs to the flip-flops 156, 158 are positive. The preset inputs to these flip-flops are also positive, in order to disable the preset inputs. It should be appreciated, of course, that other circuits may be found operable.

The trigger pulse in line 74, denoted in the accompanying drawings of FIG. 6 as $S_A$, is found as one of the inputs to AND circuit 76. The other input to AND circuit 76 is the 20 MHz clock pulse $\phi$. Thus the output of AND circuit 76 is a 25 nanosecond transmit pulse to drive the radio frequency transfer switch 30. The output 78 of AND circuit 76 is seen as an input to transfer switch 30 in FIG. 1 of the drawings.

The trigger pulse $S_A$ found in line 74 through selector gate 80a is also an input to shift registers 80 where it is shifted at the 20 MHz clock $\phi_A$ rate. Four shift registers 80 are connected in tandem to provide at least 14 sequentially pulsed outputs 82. The output of each stage of the shift register 80 develops a 50 nanosecond pulse delayed from the transmit pulse by a time proportional to its position in the shift register string.

The last, or sixteenth, output 83 is counted by the preset counter 86 until the desired number of pulses, N, has been transmitted. When the shift register bank has sent N pulses through output 83 to the transmit pulse counter 86, a signal is developed in line 88 to initiate the readout/dump cycle. This signal "N" activates selector gate 80a so that clock $\phi_C$ (FIG. 5) and data $S_B$ are now the controlling inputs to the shift registers 80. Clock pulse $\phi_C$ is developed by a 320 division of the 20 MHz clock pulse by divider 68 (FIG. 5); while $S_B$ is an output of the readout/dump control circuit 90. The signal switch 38 is also opened, disconnecting the amplifier 36 from the in/out bus 50. The outputs 82 of shift registers 80 are then sequentially energized for a period of 16 microseconds each as a result of the activating pulse $S_B$ in line 92 and clock $\phi_C$.

A counter and decoder in the divider 68 develops a (FIG. 5) three-phase clock to control the readout cycle. The first clock $\phi_C$ shifts pulse $S_B$ through the registers. The second clock $\phi_D$ is delayed 1.6 microseconds from $\phi_C$ and provides time for the A/D converter input to stabilize before initiating the convert cycle. Analog-to-digital conversion is initiated by the clock pulse $\phi_D$ (FIG. 1), and conversion proceeds using a clock internal to the converter 18. Normally, the conversion should take approximately 10.6 microseconds for the A/D converter 18 used in this implementation. The third clock output $\phi_E$ occurs 11.2 microseconds after $\phi_D$ to provide a pulse signal to strobe or read the output digital bits comprising the component of the converter 18 output.

When the readout sequence of shift registers 80 completes its cycle, thus giving a pulse signal in output 83 and in the D input of flip-flop circuit 91, flip-flop 93 in control circuitry 90 activates the parallel input mode at line 93a to the shift registers 80 to cause all of the outputs 82 of the shift registers 80 to load a signal pulse as a result of the parallel data input now present at lines 95 and the next clock pulse $\phi_C$. Line 93a is connected to the $\overline{Q}$ output of flip-flop 93. Flip-flop 91 $\overline{Q}$ output is connected by line 92 to selector gate 80a and to flip-flop 93. The signal N in line 88 is a CL input to both flip-flops 91, 93. Simultaneously, the Q output signal from flip-flop circuit 93 is seen in lead 96 actuating or sending a signal pulse to the discharge switch 52 to drain all charges on the integrating capacitors 46 and thus to reset the range gated integrator bank 16 to a zero or reference condition. It has been found that maintaining the closure of switch 52 and the simultaneous closure of all field effect transistor switches 48' for 40 clock periods of the clock time $\phi_C$ will produce the desired results. During the next succeeding clock period, the shift register parallel data inputs on line 95 are returned to a zero or no signal status so that at the next clock pulse $\phi_C$, the registers are reset. Then, at the forty-fourth pulse of clock $\phi_C$, a signal may be found at output 98 of the readout control circuit 90. A race reset cycle is initiated by this signal in lead 98, first resetting the transmit pulse counter 86 which in turn resets through line 88 flip-flops 91 and 93 to return the system to the transmit mode, and resets counter 94 to remove the clear signal from line 98.

It may be appreciated that in the sequential operation of the integrator gates 48 both for the input and for the readout cycles and during the resetting of the resistor-capacitor circuits to a zero state cycle, the pulse rate time generator continues to develop transmit pulses so that there is no apparent transmit-read cycle to be detected in the radio frequency output. When the system returns to the transmit mode, the range gate shift registers 80 pick up and synchronize to the next available transmit pulse.

Information in the digital form from the analog-to-digital converter 18 is passed then to the delay line canceller and detector 20 which operates in the fashion of a band pass filter to remove the very low frequency components of the signal, so as to eliminate clutter and stationary target signals which might be found in the echo signal. Various methods have been developed and reported in the technical literature whereby arrangements of feed-forward and feedback loops around delay line elements are used to develop a prescribed filter-type characteristic for digital components. The technique is applicable to analog signals through a linear delay line, as well as to digital signals with a shift register acting as the delay element. See for example *Radar Handbook*, edited by M. I. Skolnik, McGraw-Hill, 1970, New York, New York. Attention is particularly directed to chapter 17 and sections therein on moving target indicators and multiple delay line filters.

Figure 7:
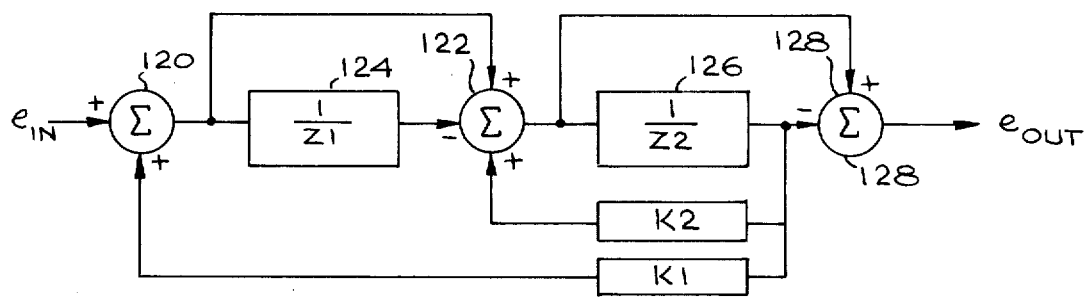
FIG. 7 is a block diagram representation of transforms useable within the preferred embodiment of the invention.

A delay line filter characteristic configuration for a digital signal is generally more desirable in the present application, due to the ease of obtaining long delay times with the shift register. An approach utilizing this technique will be outlined so that the reader may be fully apprised of an operable mode of the present invention. A general form of the two delay line canceller is shown in FIG. 7 of the accompanying drawings, in block-diagram representation. In FIG. 7, the input signal $e_{in}$ is combined in summing point 120 with feedback from the second transform output multiplied by the constant $K_1$. The result is directed to delay element 124 and to summing point 122, and is transformed in the first transform 124, as indicated. The Z notation refers to the Z-transform method commonly used in the analysis of systems containing time delay elements. The resulting signal from the first transform 124 is summed at point 122 as indicated with the feedback from the second transform, multiplied by the constant $K_2$. The result is transformed as indicated by the second transform 126 and summed as indicated in point 128 with the second transform input. In terms of the Z transform, the output signal response $(e_o/e_{in})$ is:

$$\frac{e_o}{e_{in}} = \frac{(Z-1)^2}{Z^2 - (K_1 + K_2)Z + K_1} \tag{1}$$

where $Z = e^{j\omega T}$, T being the delay time, and $K_1$ and $K_2$ are determinable feedback constants. This response corresponds to an unnormalized transfer function of the form:

$$|H(\omega)|^2 = \tag{2}$$

$$\frac{16 \sin^4 \frac{\omega T}{2}}{1 + 2K_1^2 + 2K_1K_2 + K_2^2 - 2(K_1^2 + K_1K_2)\cos\omega T + 2K_1 \cos 2\omega T}$$

For $K_1 = K_2 = 0$, i.e., with no feedback, the equation reduces to the familiar form of a simple two delay line canceller:

$$|H(\omega)|^2 = 16 \sin^4 \frac{\omega T}{2} \tag{3}$$

Using non-zero K values can modify the response and provide a more ideal bandpass response shape. By proper choice of the feedback constants, the overall response can be adjusted to optimize system performance in the presence of a given clutter spectrum. The constants found to be near optimum for the intended application are $K_1 = 0.75$ and $K_2 = 0.9375$.

The filtering action of the delay line canceller removes the DC and very low frequency signal components which constitute the interference from clutter and essentially stationary targets. The remaining signal components will be the desired AC components generated by the Doppler effect of moving targets. The existence of moving targets is detected by full-wave rectification of the remaining AC signal and comparing this value against a predetermined threshold value. In the preferred digital implementation, this rectification is accomplished by taking the absolute magnitude 132 of the signal component present in the delay line canceller 20 as illustrated in FIG. 8. Further target enhancement is accomplished by accumulating the sum of a number of successive values in an accumulator 134 and comparing this sum against a preselected detection threshold level in a threshold detector 136. In the present implementation the summation proceeds for forty successive readings as controlled by a cycle counter 138 before the output is tested for detection.

The delay line canceller and full wave detector operate on the digital data each time there is a readout of the range gate integrators 16. The final output is at some slower rate, depending on how many iterations are accumulated before the output is read. This slower digital data rate allows the use of a microprocessor to perform the calculations associated with establishing detection criteria. In practice, an Intel 8080 microprocessor has been found suitable for miniature implementation. Detector outputs can be used to establish a variable detection threshold which is derived from base line noise output. This variable threshold optimizes the probability of recognizing a target while allowing an acceptable constant false alarm rate. Each time there is a target detection, the rangetime coordinates of detection are stored for use in computing the expected closest point of approach.

A moving target in a straight line at a constant velocity across a sensed field will develop a range versus time function of the form:

$$R^2 = V^2(t_c - t)^2 + R_c^2$$

where $R_c$ and $t_c$ are the coordinates of the closest point of approach. Curvilinear regression analysis can be used to fit the observed values to this function, resulting in solutions for $R_c$ and $t_c$. The rate of change of R goes to zero at the closest point of approach. For the particular function given, the derivative of $R^2$ also goes to zero at the closest point of approach. The derivative of $R^2$:

$$\frac{d(R^2)}{dt} = 2V^2(t - t_c) = 2V^2 t - 2V^2 t_c \quad (5)$$

is of the form $y = mx + b$, which is a simple linear function. Using this relationship, a simple linear regression analysis of $R^2$ versus t will give solutions for V and $t_c$ which are then substituted in the original equation (4) to get an estimate of $R_c$.

An alternate1 computational approach may be used whereby the earliest observation is used to determine the time required for the target to move across a range bin. This range versus time data can be used as an estimate of the target velocity. Since the asymptote of the range function is simply the velocity times the time, extrapolating present range to zero at this rate will give an estimate of $t_c$ or time of closest point of approach. Later observation of R and t can then be substituted in the equation to develop an estimate of $R_c$. Due to the coarseness of the range time data and the small number of observations available, this estimation approach process will probably be as accurate and reliable as more complicated statistical analysis.

Although there have been described above specific arrangements of a target range sensor in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. A radar system comprising:
   a homodyne transceiver including means for directing received radio frequency signals in gated sections to range gated integrating means;
   range gated integrating means connected to receive said directed radio frequency signals for integrating the signals over the time period of a gated section, and including means for directing the integrated signal result to analog-to-digital converting means upon actuation by a control pulse;
   analog-to-digital converting means for converting the integrated signal result to a digital, pulsed component form upon actuation by a control pulse;
   delay line canceller and detector means for removing relatively low frequency, integrated signal digital components and for passing relatively higher frequency, integrated signal digital components to a delay line canceller and detector means output;
   digital component processor means coupled to said output for receiving over a period of time the passed relatively higher frequency, integrated signal digital components from the delay line canceller and detector means output and for computing from said received components a predicted position closest to said homodyne transceiver which a selected target object will traverse; and
   digital bit pulse control logic means for generating and selectively sending to the homodyne transceiver means, to the range gated integrating means, and to the analog-to-digital converting means control pulses for actuating each respective means in predetermined sequential order.

2. The radar system of claim 1 wherein said range gated integrating means includes a plurality of range gate switches, each of which switches includes a field effect transistor connected in series with a series resistor-capacitor network.

3. The radar system of claim 2 wherein each resistor-capacitor net work is in series with selectively conducting nodes of its associated field effect transistor.

4. The radar system of claim 3 wherein the integration is accomplished by accumulation of charge in the capacitor during a gated time period, wherein there is a resistor-capacitor network independently for each of a series of discrete time intervals in a range, and wherein the integrating means provides a sensitivity versus range-time scaling function which compensates for the inverse range-squared variation in return signal.

5. The radar system of claim 4 wherein the range gate switches further include means for applying range gating signals to the resistor-capacitor networks, means for sequentially gating the outputs of the resistor-capacitor networks to the analog-to-digital converting means, and means for resetting all resistor-capacitor networks concurrently.

6. The radar system of claim 5 wherein the switching of the range gate switches is actuated by control signals from the digital bit pulse control logic means.

7. The radar system of claim 6 wherein each range gate switch is actuated sequentially relative to the actuation of adjacent switches.

8. The radar system of claim 3 wherein the field effect transistor is actuated into the conducting mode by a pulse in sequential order relative to pulses going to all other field effect transistors in their respective range gate switches, and wherein the digital bit pulse control logic means includes shift register means for generating said pulses in sequential order upon control actuation by a control pulse.

9. The radar system of claim 8 wherein said plurality of range gate switches selectively gates signals to the resistor-capacitor networks, sequentially gates the output of said resistor-capacitor networks to the analog-to-digital converting means, and concurrently discharges the resistor-capacitor networks.

10. A range gate sequence switch control system, comprising:
shift register means for providing sequentially a plurality of pulse signals to respective electronic switches upon control actuation by a single received pulse signal;
a plurality of electronic switches, each connected electrically in series with a resistor-capacitor network and with an independent electrical analog voltage signal input network to selectively apply the electrical analog voltage signal input to the associated resistor-capacitor network when the respective electronic switch is conducting;
an output line;
readout means for electrically disconnecting the electrical analog voltage signal inputs from the plurality of electronic switches, including means for electrically connecting the output line to the plurality of electronic switches and means for sequentially closing each electronic switch; and
restoring and discharge means for restoring direct current to the signal input network and simultaneously discharging the complete resistor-capacitor network.

11. The system of claim 10 wherein each electronic switch includes a field effect transistor having a gain node connected to an output of an adjacent switch transistor for biasing said gain node when one of said plurality of pulse signals from the shift register means is received at the electronic switch.

12. The system of claim 11 wherein the shift register means comprises a plurality of tandem connected shift registers capable of a series of at least 16 pulse signal outputs; and wherein said plurality of electronic switches includes at least 14 of said electronic switches.

13. The system of claim 12 wherein each of the tandem connected shift registers has a digital data input selectively connected in parallel with each other shift register.

14. The system of claim 13 wherein the pulse signals exist at an average repetition time of 6.6 microseconds and with a uniform pseudo-random distribution of time intervals in the range of 5 to 8.2 microseconds.

* * * * *